Nov. 18, 1969         P. J. CUNNINGHAM         3,479,113
MOTION PICTURE PROJECTOR WITH VISCOUS SWITCH FOR
CONTROLLING PROJECTION LAMP
Filed Jan. 6, 1967
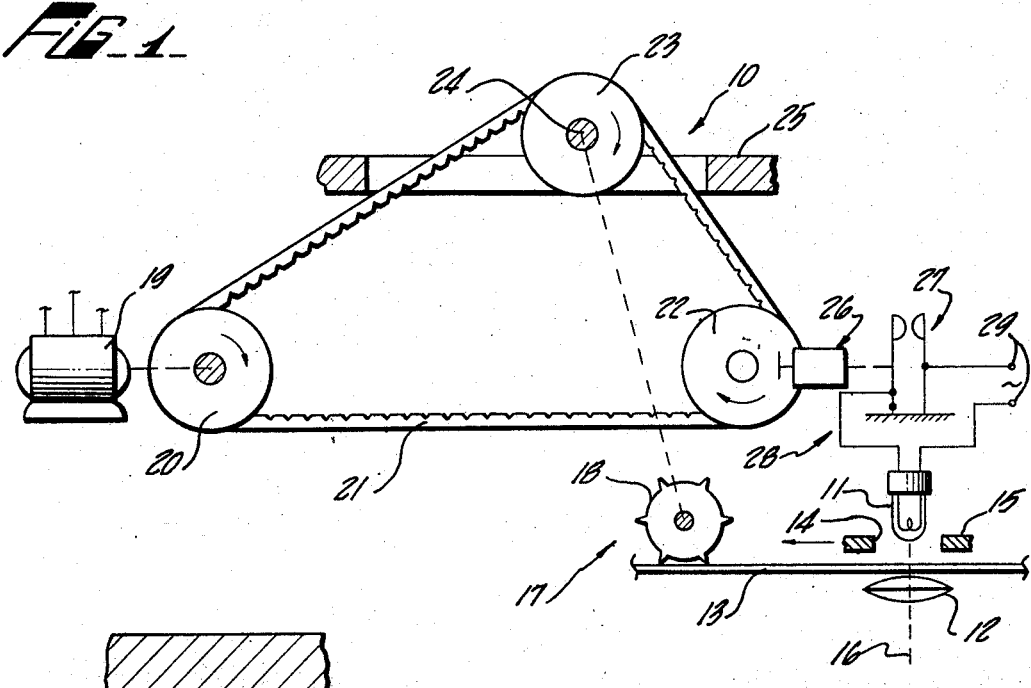
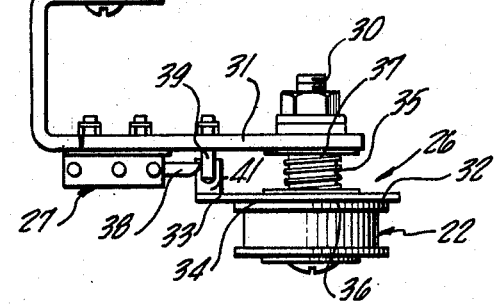
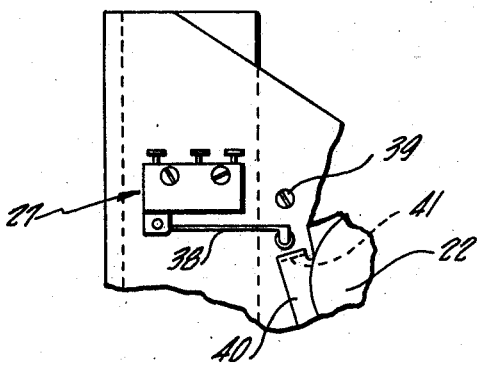
INVENTOR.
PATRICK J. CUNNINGHAM
BY
Christie, Parker & Hale
ATTORNEYS

# United States Patent Office 3,479,113
Patented Nov. 18, 1969

3,479,113
MOTION PICTURE PROJECTOR WITH VISCOUS SWITCH FOR CONTROLLING PROJECTION LAMP
Patrick J. Cunningham, Fullerton, Calif., assignor, by mesne assignments, to Bell & Howell Company, Chicago, Ill., a corporation of Illinois
Filed Jan. 6, 1967, Ser. No. 607,720
Int. Cl. G03b 1/00
U.S. Cl. 352—167                              1 Claim

ABSTRACT OF THE DISCLOSURE

A projection lamp energization cut-off device for a motion picture projector has a belt-driven film advance mechanism, the belt passing around a rotatable pulley, and includes a spring-loaded switch in the lamp energization circuit and a drag plate engaged with a face of the pulley via a viscous fluid and mounted for angular motion about the pulley axis when the pulley is rotated by the belt. The drag plate moves against the switch bias to operate the switch into an ON state when the pulley is rotated, thereby to monitor the operation of the film advance mechanism and turn the lamp off when the advance mechanism ceases to operate.

CROSS-REFERENCE TO RELATED APPLICATION

This invention pertains to a mechanism having particular utility in the motion picture display system described in copending commonly-owned application Ser. No. 485,768, filed Sept. 8, 1965.

BACKGROUND OF THE INVENTION

Field of the invention

This invention relates to a circuit control device effective to operate a switch in response to movement of a monitored movable member. More particularly, it pertains to a switch viscously coupled to a rotary member for operation to control a circuit in which the switch is located in response to starting and stopping of rotation of the rotary member, such as a belt guide pulley in a belt-driven film advance mechanism for a motion picture projector.

Description of the prior art

Small motion picture projectors, i.e., those of the type intended for home and similar use as opposed to projectors for use in theaters and auditoriums, commonly include a belt-driven film advance mechanism for stepping film past a shutter aperture, located on an optical axis from a projection lamp to a projection lens system, on a frame-by-frame basis. The projection lamp energization circuit normally is separate from the energization circuit for the motor provided for driving the belt of the film advance mechanism so that the lamp can be switched ON and OFF independently of the belt drive motor. Thus, if the projection lamp is energized and a malfunction occurs in the projector such that the film comes to a stop at the shutter aperture, it is likely that the film will be severely damaged by the heat directed to the film from the projection lamp. The film can come to such a stop, for example, if the belt drive motor burns out or its energization circuit is interrupted, or if the belt should break, or if the film advance mechanism between the belt and the film should jam.

This invention provides a simple, effective and compact mechanism for controlling the operation of the projector lamp in response to movement of the drive belt for the film advance mechanism of a motion picture projector. If the film advance mechanism should come to a stop, or should be operated so slowly that it is likely that the film will be damaged by heat from the lamp, the energization circuit of the lamp is interrupted. However, once the film advance mechanism is rendered operative, the lamp is again energized. The control mechanism imposes minimal loading upon the belt drive motor, with the result that the belt drive motor can be selected to meet power requirements prescribed essentially only by the power required to operate the film advance mechanism.

At present, the control mechanism provided by this invention finds its preferred utility in conjunction with the film display system described in copending, commonly-owned application Ser. No. 485,768, filed Sept. 8, 1965. This copending application relates to a system in which several motion picture projectors, each having its own projection screen, are disposed at spaced fixed locations along the path of travel of a single length of film between film supply and take-up stations. The display system includes a control system arranged to stop all or appropriate ones of the projectors if a single projector should jam or break down or if the film should break. Because it is likely that the power to a given projector may be interrupted only momentarily by the control system relative to a temporary problem at that or another projector for a time insufficient to cause the film advance mechanism of the given projector to come to a complete stop, and because the life of a projection lamp is related to the number of times it is turned on and off, it is preferable to turn a given lamp off only when the film advance mechanism of that projector comes to a stop. The present control mechanism has this characteristic.

The utility and application of the present invention, however, is not confined to motion picture projectors or to the film display system described above. It may be used to advantage wherever a circuit must be completed or interrupted when and as movement of a movable member, selected as being the ultimate source of the desired control signal, is either commenced or ended.

SUMMARY OF THE INVENTION

Generally speaking, the invention provides a circuit control device which includes a switch and a movable member. The switch includes a resiliently biased actuating member which is effective when and as long as a selected force is applied to it along a selected line. The movable member has a surface which is movable along a predetermined line when the member is moved, the switch being operated in response to such movement of the surface. A drag member is mounted adjacent the movable member surface for movement along the predetermined line and has a surface opposed to the movable member surface. A quantity of fluid having a selected viscosity is disposed between the two surfaces. The apparatus includes means urging the drag member surface into contact with the movable member surface. Means are coupled to the drag member and are engageable with the switch actuating members along the aforementioned selected line. The last-identified coupled means, the urging means and the fluid are selected and arranged in cooperation so that movement of the movable member surface along the predetermined line at a rate at least equal to a selected rate is manifested at the coupled means for transfer to the switch actuating means as a force having a component effective along the selected line with a value at least equal to the selected force.

BRIEF DESCRIPTION OF THE DRAWING

The above-mentioned and other features of the invention are more fully set forth in the following description of a preferred embodiment of the invention, which description is presented with reference to the accompanying drawing, wherein:

FIG. 1 is an electro-mechanical schematic diagram of the invention;

FIG. 2 is a side elevation view of the viscous switch; and

FIG. 3 is a top plan view of the switch shown in FIG. 2.

DESCRIPTION OF THE PREFERRED EMBODIMENT

FIG. 1 schematically depicts a portion of a motion picture projector 10 which includes a projection lamp 11 and an imaging lens assembly 12 disposed on opposite sides of the path of movement of a strip of motion picture film 13 through the projector. The film is moved through the projector on a frame-by-frame basis past a shutter aperture 14 in an aperture plate 15, located adjacent the film between the lamp and lens assembly, the aperture being centered on an optical axis 16 of the projector. Such movement of the film is produced by operation of a film advance mechanism 17 which includes a sprocket wheel 18 engaged with the film. The film advance mechanism is powered by a motor 19 connected to a belt drive pulley 20 for driving a timing belt 21. The timing belt is engaged with an idler pulley 22 and with a driven pulley 23 mounted on a rotatable input shaft 24 of the film advance mechanism. The drive motor, and the idler and driven pulleys are suitably mounted to a projector foundation plate 25.

In order that an energization circuit for lamp 11 may be interrupted when film 13 stops moving across the optical axis in response to the film advance mechanism coming to a stop, a sensing device 26 is coupled to the drive train of the film advance mechanism for sensing rotation of idler pulley 22 and for operating a switch 27 coupled in a lamp energization circuit 28 between the lamp and input terminals 29 for the circuit. The sensing device and its relation to the switch are shown in greater detail in FIGS. 2 and 3.

Belt idler pulley 22 is rotatably mounted by a bearing assembly (not shown) on a shaft 30 which is carried by a mounting bracket 31. The bracket is fixed relative to the projector foundation plate. The pulley inboard face 32, i.e., the face of the pulley toward the bracket, is basically planar and normal to shaft 30. A drag plate 33 is mounted on the shaft adjacent the pulley inboard face and has a substantially flat drag face 34 opposed to the pulley and oriented normal to the shaft. The drag plate is rotatable about shaft 30. The drag plate and the pulley are maintained in spaced relation to the bracket by a tubular spacer 35 disposed around the shaft.

A quantity of viscous fluid 36 having a selected viscosity characteristic is disposed between the drag plate and the pulley between surfaces 32 and 34. The drag plate is urged into contact with pulley face 32 by a light compression spring 37 mounted around the spacer between the drag plate and the bracket and exerts a predetermined force upon the drag plate.

Switch 27 is mounted to bracket 31 adjacent the pulley as shown in FIGS. 2 and 3. The switch includes a spring loaded actuating arm 38 which extends from the switch to adjacent the drag plate. When a selected force is applied to the end of the arm along a line normal to the length of the arm, the arm is moved sufficiently against its spring loading to operate the switch to a closed condition from its normally open condition. As noted, the switched is located in the lamp energization circuit for controlling, in an on-off manner, the energization of projector lamp 11.

Movement of the switch actuating arm in a direction producing operation of the switch to a closed condition is limited by a stop pin 39 secured to the bracket.

The drag plate is basically circular in configuration, but has a radial projection 40 which carries a lug 41 extended toward bracket 31 at such a position as to engage the adjacent end of the switch actuating arm when the drag plate is rotated about shaft 30.

When motor 19 is operated to produce forward-advancing operation of the film advance mechanism, pulley 22 rotates clockwise about its mounting shaft. Because of the presence of the viscous fluid between the pulley and the drag plate, rotation of the pulley tends to produce corresponding rotation of the drag plate because of the viscous drag of the fluid against the drag face of the drag plate. Thus, rotation of the pulley causes the drag plate to rotate so as to cause lug 41 to engage the switch operating arm and, when the drag on the drag plate reaches a selected level, to operate the switch, thereby to turn the projection lamp ON. The viscosity of the fluid, the force imposed upon the drag plate by spring 37, the finishes and areas of surfaces 32 and 34, and the geometry of the drag plate are all cooperatively related so that, when the pulley is rotated at a rate equal to or greater than a predetermined rate, the force exerted by the lug on arm 38 is equal to or greater than the force required to operate the switch from its normally open condition.

The predetermined rotational rate of the belt idler pulley is selected so that the switch is operated only when the film is moving past shutter aperture 14 at a rate equal to or greater than the minimum rate at which film may be safely moved past the energized lamp. This rate is such that if the film were moved more slowly past the lamp, the heat from the lamp would damage the film.

Sensing the rotation of the belt idler pulley or of driven pulley 23 for the purposes of controlling the projection lamp is preferred to sensing the rotation of drive pulley 20. If the belt should break, the film would stop moving past the lamp, but a control mechanism responsive to rotation of the drive pulley would not be effective to turn the lamp off in such a case.

When pulley 22 is rotating during normal operation of the projector, it rotates at a rate much greater than the rate productive of operation of switch 27. In such cases, the drag plate is stationary in a position in which actuating arm 38 is engaged with stop pin 39, and the pulley rotates relative to the drag plate. When the pulley either stops rotating or rotates at too slow a speed, the spring bias effective upon arm 38 acts to move the drag plate counterclockwise about its axis of rotation and the switch returns to its normally open state. The pulley may stop for any one of a number of reasons, including stopping of motor 19 intentionally or as a result of a motor malfunction, breaking of belt 21, or jamming or other malfunctioning of the film advance mechanism. In each case, however, the lamp is turned off before the heat produced by the lamp can damage film 13.

In order that the size of motor 19 may be kept to a minimum, switch 27 and sensing and operating device 26 are constructed to provide the minimum possible loading upon the motor.

It was mentioned above that the presently preferred use of this invention is in the context of a system in accord with the description presented in the above-cited copending application. This invention is used in such a system in place of a lamp energization control coupled to the projector motor energization circuit because the motors are preferably delta-wound motors and because it is likely that the motors may be momentarily shut off for such short intervals that the film never comes to a stop or never moves so slowly as to be damaged by the heat from the projection lamps.

It is presently preferred that the viscous fluid used between the belt idler pulley and the drag plate be Dow-Corning 560 fluid. This fluid is a molecular mixture of a synthetic oil and a silicone fluid proprietary to Dow-Corning. This fluid has a viscosity of SAE 5 (560 centistokes) and has a very flat viscosity/temperature curve.

It will be apparent that the present invention is not restricted to the structure and use described above. The invention may also appear for example, as an arcuate drag plate engaged with the rim of a rotatable wheel or with the surface of a shaft the drag plate being mounted for limited movement in the same direction as the adjacent member for actuating a switch when sufficient viscous drag force has been imposed upon the drag plate by viscous shear in a viscous fluid between the drag plate and the movable member. It will also be apparent that the velocity required to produce the desired force can be controlled by appropriate selection of viscous fluids, of the forces urging the drag plate toward the movable member, of the effective area of the drag plate drag surface, of the geometry of the structure, and of the finishes of the surfaces confining the viscous fluid. As a result, the foregoing description is not to be considered as explicitly limiting the scope of this invention such description is of only a presently preferred embodiment of the invention.

What is claimed is:

1. In a motion picture projector having a projection lamp past which motion picture film moves in response to operation of a belt-driven film advance mechanism, an energization circuit for the lamp, and a rotatable pulley engaged with the film advance mechanism drive belt, the improvement in means for interrupting the energization circuit upon cessation of operation of the film advance mechanism comprising a normally open switch in the energization circuit for controlling energization of the lamp and disposed adjacent the pulley, and switch operating means operatively coupled to the pulley and responsive to rotation thereof in a selected direction for operating the switch into a lamp energizing state and for maintaining the switch in said state when and so long as the pulley is rotated in the selected direction at a rate at least equal to a selected rate, the switch operating means including a drag member mounted adjacent the pulley for rotation about the same axis as the pulley relative to the pulley, the drag member having a drag surface exposed to an adjacent surface of the pulley, the switch having a spring-loaded actuating member extending to adjacent the drag member, means coupled to the drag member engageable with the actuating member upon rotation of the pulley in the selected direction for operating the actuation member, means biasing the drag member toward the pulley with a selected amount of force, and a quantity of fluid having a selected viscosity disposed between the pulley and the drag member surfaces.

References Cited
UNITED STATES PATENTS

| | | | |
|---|---|---|---|
| 939,110 | 11/1909 | Taira | 352—155 |
| 2,009,532 | 7/1935 | Taylor | 352—152 |

NORTON ANSHER, Primary Examiner

M. H. HAYES, Assistant Examiner